US005849398A

United States Patent [19]

Petrosky

[11] Patent Number: 5,849,398

[45] Date of Patent: Dec. 15, 1998

[54] TRANSPARENTIZED MEDIUM AND PROCESS FOR MAKING SAME

[75] Inventor: Linda M. Petrosky, Endicott, N.Y.

[73] Assignee: Azon Corporation, Johnson City, N.Y.

[21] Appl. No.: 881,860

[22] Filed: Jun. 24, 1997

Related U.S. Application Data

[60] Provisional application No. 60/020,769, Jun. 28, 1996.

[51] Int. Cl.$^6$ .......... B32B 3/00

[52] U.S. Cl. .......... 428/211; 427/161; 427/282; 427/288; 427/558; 428/918

[58] Field of Search .......... 427/161, 282, 427/288, 558; 428/211, 918

[56] References Cited

U.S. PATENT DOCUMENTS

| | | | |
|---|---|---|---|
| 4,100,329 | 7/1978 | Neithardt, Jr. | 428/413 |
| 4,237,185 | 12/1980 | Lombardi et al. | 428/337 |
| 4,911,948 | 3/1990 | McIntyre | 422/282 X |
| 4,990,364 | 2/1991 | Bolte et al. | 427/44 |
| 5,055,354 | 10/1991 | Simcoke | 428/342 |
| 5,207,871 | 5/1993 | Murphy et al. | 162/164 |

*Primary Examiner*—Michael Lusignan
*Attorney, Agent, or Firm*—Gifford, Krass, Groh, Sprinkle, Patmore, Anderson & Citkowski, P.C.

[57] ABSTRACT

A transparentized paper is prepared by coating a transparentizing medium on to a paper substrate by a screen coating process. The method may be carried out on a continuous basis, and the medium may comprise an ultra-violet curable resin. Also disclosed is a universal vellum prepared according to the method of the invention, and having a first side which has a smooth texture and may be utilized for electrostatic, pen plotter and xerographic applications, and a second side having a rougher texture which may be utilized for drafting and ink-jet printing applications.

10 Claims, 2 Drawing Sheets

TRANSPARENTIZED MEDIUM AND PROCESS FOR MAKING SAME

RELATED APPLICATION

This patent application claims priority of U.S. provisional patent application Ser. No. 60/020,769, filed Jun. 28, 1996.

FIELD OF THE INVENTION

The present invention pertains to a new, solvent-free process for fabricating a universal-type, translucent, transparentized sheet material and, more particularly, to a one-step, continuous method of coating a substrate with a polymer resin that is ultraviolet-curable, in order to produce a transparent or translucent medium.

BACKGROUND OF THE INVENTION

Standard methods for fabricating a transparent or translucent paper product have heretofore usually required the step of impregnating a paper web with a transparentizing medium comprising an organic-type, solvent-filled hydrocarbon coating or a solvent-filled synthetic resin. In order to provide sufficient transparency thereto, the transparentizing medium was allowed to penetrate into the cellulose fibers of the paper. The solvents were often volatilized or driven from the coatings by heat and/or a stream of air during the application process.

Such transparentizing processes were often difficult to control, and the final product was often inconsistent from run-to-run or batch-to-batch. The volatility of the solvent had to be carefully controlled, as well as the degree to which the transparentizing medium was impregnated into the cellulose fibers of the paper.

The final products were often of poor quality. Many of the transparent papers tended to yellow over time. Many retained a residual odor. Some papers were greasy to the touch. Increasing concerns over environmental quality have led to restrictions on the emission of volatile solvents by industry. Consequently, solvent-free coating methods were sought.

Methods were developed using hot wax or hot melt processes. The media used in these methods were heated and then impregnated into the paper fibers. The products made by these processes, however, were not entirely satisfactory, since the papers also tended to yellow with time, and the impregnations had undesirable partial mobility.

Recently, a solvent-free transparentizing method of paper manufacture was disclosed in U.S. Pat. No. 5,055,354 (entitled "Transparentized Paper and Method for its Manufacture" and issued to SIMCOKE on Oct. 8, 1991). This new solvent-free process transparentizes the paper by coating the paper with a solventless medium, retaining the medium on the paper for a dwell time sufficient to saturate only a portion of the paper, and then wiping off the excess medium with a wiper blade.

More recently, a transparentizing paper process using an ultraviolet-curable resin was developed by MURPHY et al, as disclosed in U.S. Pat. No. 5,207,871 (entitled "Process for Making Transparent Paper Using a UV Curable Compositions of Maleate, Vinyl Monomer and an Allyl Compound" and issued May 4, 1993). With this method, the resin is applied to the paper substrate as a cold liquid, which requires at least thirty minutes to penetrate and saturate the cellulose fibers. After saturating the paper, the resin is cured. The substrate can be a paper stock or a fiberglass insulative sheet.

The present invention is a transparentizing paper fabrication process that uses ultraviolet-curable resins, including those which may be similar to ones employed in the aforementioned MURPHY et al technique. Applicant's invention may be utilized with a variety of substrates, but in one preferred embodiment employs a cottonized paper known in the trade as "rag paper". The rag paper used in this specific embodiment of the invention has a cotton-content ranging from approximately 25–100% by weight. This cotton paper produces a unique paper product of high durability, but exhibits a suppleness not found in ordinary paper stock or fiberglass mesh. Paper thus produced is "universal" in its utility insofar as it may be employed for drafting, ink-jet printing, electrographic printing, pen plotting or xerography; it may also be coated with imaging compositions such as diazo compositions, thermally activated compositions and the like.

It is a notable feature of this invention that the UV-curable resins are applied by a screen coating process, a technique that has several advantages over the process of MURPHY et al. The resins applied in accord with this invention have better penetrability and saturation, thus giving a more uniform product and eliminating or minimizing the added step of "wet-packing" the material, i.e., allowing time for the resins to penetrate and saturate the paper fibers, as is required in prior art processes. In addition, the coating process of the present invention does not damage the surface of the paper. Papers produced by the present invention are free of volatile organic compounds (VOCs) and are thus suitable for high temperature xerographic applications. The final product does not yellow with time, as is common in products produced by other such method, and the impregnant will not leach out of or migrate from the paper, thus preventing damage to equipment such as plotter heads. The transparentized paper of this, invention also has a more aesthetic appearance than the paper products created by using methods of the prior art.

SUMMARY OF THE INVENTION

In accordance with the present invention, there are provided a transparentizing process and a system for coating and impregnating a substrate with a transparentizing medium such as an ultraviolet-curable resin. The medium is applied to at least one surface of the substrate by a screen coating process. Two screens can be used to simultaneously coat both sides of the substrate. The transparentizing medium may be heated during application, thus increasing its penetration and saturation into the web. Heating the medium also has the advantage of increasing the line speed of the moving web, due to the medium's increased flowability. The heated medium also has lower surface tension, causing an improved penetration into the substrate. The increased penetration and saturation eliminate the need for the step of "wet-packing", in which off-line time must be provided in order to allow the migration of the medium into the substrate. The present invention provides a truly continuous, one-step technique for producing transparentized media. A paper product fabricated by the invention has universality, in that it can be used in a wide variety of printing processes, such as inking, plotting, drafting, xerography, inkjet, diazo coating, thermal coating and the like.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, most transparentizing processes using a solvent-free, liquid resin for impregnating the paper fibers require a "wet-pack"period. The "wet-pack" period is that time in which the resin liquid is allowed to saturate and impregnate the paper fibers. In the aforesaid process of MURPHY et al, this wet-pack period lasts typically about thirty minutes. In other processes, wet-packing may require up to three days of storage, sometimes at elevated temperatures. In a process wherein there is a continuously moving web, it is obvious that the throughput and speed of the system would be severely compromised as a result of wet-packing. Such a continuous system may in fact even be unworkable with the wet-pack limitation. The present invention features a truly one-step, continuous process, wherein a resin is applied to a continuous web of a substrate, typically paper, by a screen coating process which allows for increased penetration and saturation of the paper fibers, so that (1) the web speed can be increased; (2) the need for wet-packing is eliminated or greatly reduced; and (3) the strength of the paper is increased, permitting the use of lower rag content, or all-wood based, papers. Both the increase in web speed and the elimination of wet-packing provide for a dramatic increase in throughput.

Figure 1:
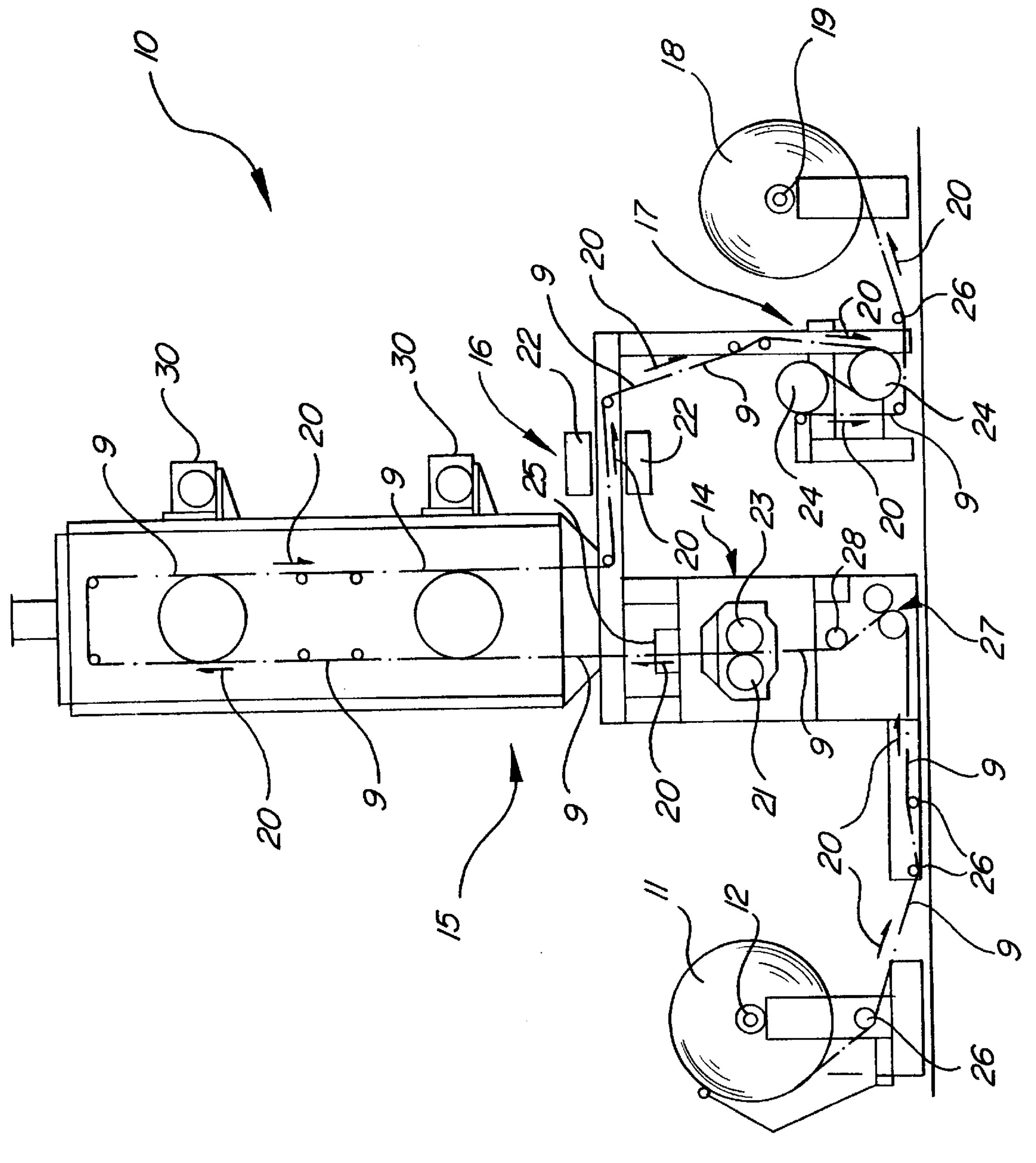
FIG. 1 illustrates a schematic diagram of one particular fabricating system utilized to transparentize a continuous web of paper, in accordance with this invention.

Now referring to FIG. 1, the transparentizing system 10 of this invention is illustrated. A feed roll 11 is positioned on a mandrel 12 for continuously feeding a generally planar web 9 of substrate material, in one preferred embodiment rag paper, to a resin coating station 14. After being coated with the resin, the web 9 passes through a heating station 15, an ultraviolet curing station 16 and a cooling station 17. (It should be noted that heating is employed to enhance the saturation rate of the paper, but is optional.) The transparentized paper is then wound upon storage roller 18, which is rotationally supported on mandrel 19. The feed path from the feed roll 11 to the storage roller 18 is depicted by arrows 20.

The illustrated transparentizing system 10 uses a modified Stork screen coater, Model No. STS-1200, manufactured by Stork X-cel B.V., of Boxmeer, Holland. Coaters of this type are employed in screen printing to deposit an imagewise pattern of ink onto a member by a stenciling process in which the ink is forced through a patterned screen and on to the member. Heretofore, a screen process has not been employed to dispense a transparentizing medium on to a substrate. The paper web 9, leaving the feed roller 11, passes through a number of tensioning rolls 26 to a pair of nip rollers 27 and guide roller 28. From the guide roller 28, the web 9 passes through the coating station 14, comprised of a pair of mesh-screened, coating rollers 21 and 23. The mesh-screened rollers 21 and 23 allow a liquid resin to pass through the mesh onto the web 9. In the present invention, the coating may be applied to one or both sides of the web 9. Two sided coatings are typically employed where relatively thick stock is being coated, or when different resin compositions or mixtures are applied to the two sides of the web. In those instances where only one side is coated, one of the rollers is replaced with a solid cylinder which is positioned so as to avoid contact with the web. In this manner, damage to the web 9, or the unused screen is prevented.

The liquid resin can, in one embodiment, be a non-acrylic, ultraviolet-cured resin, known as Desolite, formula numbers 2001-6 and 2001-18, manufactured by DSM Desotech, Inc., of Elgin, Ill., although the invention may be utilized in conjunction with other photo-curable resins.

In some instances, the resin is applied hot to web 9. The average line speed of the web 9 is typically between 30 and 100 meters/minute, depending upon the resin characteristics, the temperature and the screen size of the coating roller 21. Typical mesh sizes for the coating roller 21 are between 105 to 155 (5 to 8 $\mu$m). Typical resin coating weights (c.w.) for desired opacity (opposite of transparency), given in percent, are illustrated in Table 1, below, and it is to be understood that other combinations of coating weights and paper types may be employed:

TABLE 1

| Cotton in rag paper | 30% Opacity | 60% Opacity |
|---|---|---|
| 25% | 5# c.w. | 2.5# c.w. |
| 35% | 6# c.w. | 3.0# c.w. |
| 100% | 8# c.w. | 4.0# c.w. |

The resin may be heated to above ambient temperature prior to application by means of a heating coil or a jacketed holding (mixing) pot. Typically the resin is heated to a temperature in the range of 80°–250° F., and most typically to a temperature in the range of 90°–150° F. The heated resin will flow better through the mesh roller 21. Because of the reduced viscosity of the heated resin, the line speed of web 9 can be increased considerably. Average viscosity ranges for the heated resin are approximately between 45 to 800 centipoises/sec. The average web speed in this viscosity range is, as aforementioned, approximately between 30 and 100 meters/minute.

After the web 9 is coated, it passes through wiper blades 25 which remove the excess resin from the surface of the web, and/or redistribute the resin on the web. It should be noted that the use of the wiper blades 25 is optional, and will depend upon the particular application and material being employed. From the coating station 14, the coated web 9 enters a heating station 15 comprising a bank of ovens. The temperature of web 9 is maintained approximately between 55 and 130° F., in order to allow the resin to saturate the fibers of the paper. In order to maintain constant heating temperatures, a pair of blowers 30 helps to recirculate the heated air in the oven chamber. The preferred operating temperature is approximately 130°–1600° F. The heating station may be dispensed with in those instances where penetration of the resin into the web is rapid. In other instances, as for example when thick stock is being coated, a short wet-pack step may still be needed; however, the high line speeds achieved through the present invention will compensate for this additional step.

The web 9 then passes from the ovens to an ultraviolet curing station 16. The curing station comprises respective upper and lower banks of ultraviolet curing lamps 22, and as the web 9 passes between the curing lamps 22, it is cured. The choice of curing lamps will depend upon the particular resin composition employed. In most instances, the lamps will be medium pressure mercury lamps sufficient to deliver between 0.1–2 Joule/cm$^2$ to the coated paper. Some preferred lamps comprise D. V. or H bulbs providing approximately 300–600 watts/inch.

From the ultraviolet curing station 16, the web 9 passes to a pair of cooling rollers 24, which remove the heat from the web. The transparentized paper web 9 is then stored upon the storage or take-up roller 18, as shown.

It is a notable feature of the present invention that a screen coating process is employed for the deposition of the transparentizing resin on the web of substrate material. Screen coating processes are typically utilized for printing, and have not been used for the application of a non-patterned body of transparentizing material onto a web of substrate material. In accord with the present invention, it has been found that a controlled amount of transparentizing material, in this instance, a photo-curable resin, may be accurately deposited upon a web of substrate material without any damage to the texture of the substrate. The technique applies sufficient pressure to force at least a portion of the material into the substrate, like prior art direct gravure, wire rod or blade coating techniques; but unlike prior art processes, the present invention does not impose any undesirable texture pattern onto the substrate. While the screen coating technique is described herein with reference to the application of a curable resin onto a web of paper, it is to be understood that other transparentizing media such as oils and the like may be similarly coated.

In a general sense, the process disposes a screen, typically having a fine mesh, on one or both sides of the substrate to be coated. The transparentizing medium is squeegeed through the openings in the screen, onto the substrate. The technique avoids patterning or otherwise damaging the substrate, and may be carried out at relatively high rates of speed.

Figure 2:
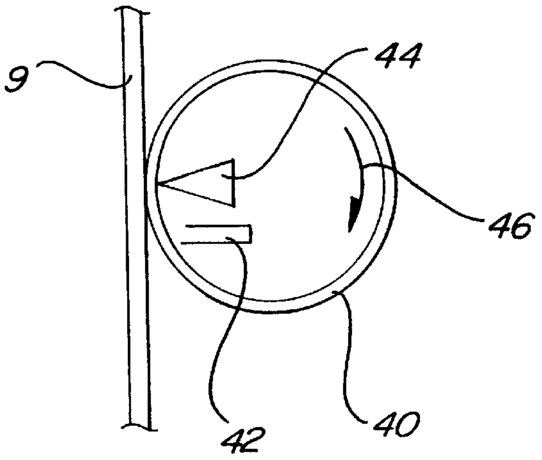
FIG. 2 is a schematic depiction of a screen coating technique which may be employed in the practice of the present invention.

Referring now to FIG. 2, there is shown a stylized depiction of a continuous roller based screening process for carrying out the present invention. As depicted therein a web of substrate material 9 is carried through a coating apparatus. A screen coating roller 40 contacts one surface of the web 9. A dispenser 42, disposed within the roller 40, is operative to dispense a transparentizing medium, such as the resin described above, onto the interior surface of the roller 40. A squeegee 44 contacts the inner surface of the roller. The roller 40 rotates as indicated by arrow 46 so as to travel with the moving substrate web 9, and the squeegee 44 forces the transparentizing medium through the mesh of the roller 40 and on to the substrate 9. Clearly, other modifications and variations of this process may be employed in keeping with the spirit of the present invention. As noted hereinabove, the back surface of the web 9 may be coated simultaneously with the coating of the front surface, in which instance another roller assembly including a coating roller, squeegee and dispenser as described will be placed so as to contact the back surface of the web 9. In other instances, the screen process may be carried out with differently configured apparatus. For example, the process may be carried out on single sheets, in a non-continuous manner by use of a generally flat screen. Alternatively, the screen may be configured as a belt or as a curved sheet. All of such embodiments are within the contemplation of the present invention.

Figure 3:
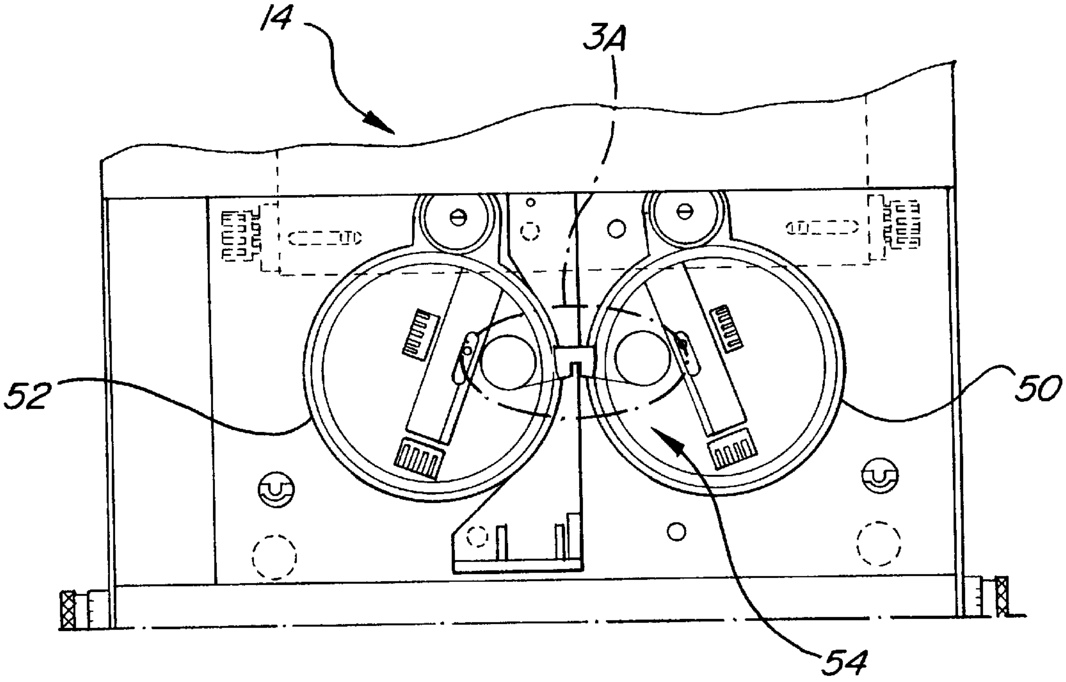
FIG. 3 is a detailed depiction of the coating head utilized in the present invention.
Figure 3A:
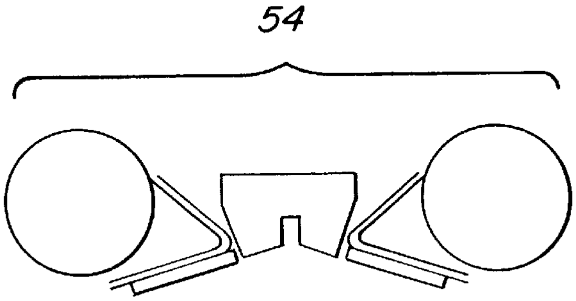
FIG. 3A is an enlarged detailed depiction of pressure applying squeegee portion of the present invention.

Referring now to FIG. 3, there is shown a detailed depiction of the coating station 14 of the apparatus of FIG. 1, illustrating, in enlarged detail, the actual screen coating heads thereof. It will be noted that the head as illustrated is configured to include two roller assemblies 50 and 52, each of which may function to apply a medium to a web. FIG. 3A illustrates in enlarged detail the actual pressure applying squeegee portions 54 associated with the coating rollers 50 and 52. It is to be understood that the apparatus depicted in FIG. 3 is representative of one particular apparatus which may be employed in the present invention, and other apparatus may also be utilized.

It has been found that through the use of the present invention, a transparentized vellum may be prepared which has "universal" applicability. Generally, transparentized vellums utilized for drafting purposes and for ink-jet printing and the like require a somewhat textured surface in order to provide optimum imaging; whereas, media employed for electrostatic printing, pen plotting, thermal printing or xerographic printing ideally have a smoother surface. Consequently, it is standard practice in the industry to manufacture different types of media for different applications. Clearly, it would be desirable to have a single medium which could be utilized for all applications, since this would simplify manufacturing, shipping, storage and inventory of material. In accord with the present invention, it has been found that a transparentized medium may be prepared which can be utilized for all of these different graphic processes. The medium of the present invention includes one surface which has a fairly smooth texture, and is ideally suited for xerographic, pen plotting, thermal printing and electrostatic applications whereas the second surface has a texture making it suitable for drafting and ink-jet printing.

This universal medium is prepared by coating a paper, which is most preferably a 25–100% rag based paper, by utilizing the screen process disclosed herein. The coating is accomplished on an apparatus as generally shown in FIG. 1. One preferred group of resins are the Desolite® U.V. curable resins 2001-6 and 2001-18 described above. The paper is screen-coated from one side and the side which is directly coated develops a smooth texture making it suitable for pen plotting, electrostatic and xerographic processes whereas the back surface develops a somewhat rougher texture, resultant from the disturbed fiber of the web, making it suitable for ink-jet and drafting applications.

Within the parameters disclosed herein, a number of specific coating processes may be implemented. For example, it has been found that high quality, universal media can be prepared using the aforedescribed Stork STS-1200) coater. When the paper being coated comprises 14–16 pound stock, the impregnating resin will comprise the Desolite® 2001-18. Resin loading will depend on the cotton content of the paper and the desired degree of opacity, as set forth in Table 1. In this group of coatings, the resin is not preheated, but is applied at ambient temperature. Coating is done from one side only, and line speeds typically run 80 to 90 meters per minute when the cotton content of the paper is below 100%. When 100% cotton paper is employed, the line speed may be increased to 100 meters/minute, because of the paper's higher strength. After coating, the substrate is heated and photo-cured as described above. Transparentized vellums are typically prepared from 20 pound stock, and it has been found that the DESOLITE® 2001-6 resin is most advantageously employed in such processes, while all other parameters are as above.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method for preparing a universal transparentized vellum having a first surface which is relatively smooth and a second surface which has a greater degree of texture than does said first surface, the method comprising the steps of:

providing a generally planar substrate comprising a rag based paper having a cotton content in the range of 25–100% by weight;

providing a transparentizing medium; and applying said transparentizing medium to the substrate by a screen coating process wherein a first surface of the substrate is contacted with a mesh screen, and a second surface of the substrate is free of the screen, and the transparentizing medium is forced through the screen and on to the substrate to deposit a controlled layer thereupon, so as to produce a coated substrate wherein the first surface, which was in contact with the screen when the transparentizing medium was forced therethrough is relatively smooth, and the second surface thereof, which was not in contact with said screen has its fibers disturbed so as to produce a texture which is rougher than that of the first surface.

2. A method as in claim 1, wherein the transparentizing medium is a photo-curable resin, and wherein method includes the further step of illuminating the coated substrate, so as to cure the resin.

3. A method as in claim 1, wherein the step of applying the transparentizing medium on to the substrate includes the further step of preheating the medium to a temperature above ambient, prior to coating the medium on to the substrate.

4. A method as in claim 1, including the further step of heating the coated substrate, so as to enhance the penetration of said medium into said substrate.

5. A method as in claim 1, wherein said screen is configured as a cylindrical roller.

6. A method as in claim 1, wherein the step of applying the medium to said substrate comprises applying said medium in a continuous process.

7. A method as in claim 1, wherein said medium is an ultra-violet curable resin.

8. A method as in claim 1, wherein said screen has a mesh size of approximately 105–155.

9. A transparentized substrate made in accord with the process of claim 1.

10. A transparentized substrate as in claim 9, wherein said transparentizing medium is a photo-curable resin.

* * * * *